(12) United States Patent
Black et al.

(10) Patent No.: US 10,422,673 B2
(45) Date of Patent: *Sep. 24, 2019

(54) FLOW REGIME IDENTIFICATION OF MULTIPHASE FLOWS BY FACE RECOGNITION BAYESIAN CLASSIFICATION

(71) Applicant: Saudi Arabian Oil Company, Dhahran (SA)

(72) Inventors: Michael John Black, Dhahran (SA); Talha Jamal Ahmad, Dhahran (SA); Mohamed Nabil Noui-Mehidi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 734 days.

This patent is subject to a terminal disclaimer.

(21) Appl. No.: 14/632,636

(22) Filed: Feb. 26, 2015

(65) Prior Publication Data

US 2015/0276447 A1 Oct. 1, 2015

Related U.S. Application Data

(63) Continuation-in-part of application No. 14/595,689, filed on Jan. 13, 2015, now Pat. No. 9,424,674.

(Continued)

(51) Int. Cl.
*G01F 1/66* (2006.01)
*G01F 1/74* (2006.01)
(Continued)

(52) U.S. Cl.
CPC ............ *G01F 1/66* (2013.01); *G01F 1/74* (2013.01); *G01P 5/001* (2013.01); *G06T 11/00* (2013.01); *G06T 11/003* (2013.01)

(58) Field of Classification Search
CPC ... G01F 1/66; G01F 1/667; G01F 1/74; G06T 11/00; G06T 11/003
See application file for complete search history.

(56) References Cited

U.S. PATENT DOCUMENTS

| 5,354,146 A | 10/1994 | O'Konek |
| 5,485,743 A | 1/1996 | Taherian et al. |

(Continued)

FOREIGN PATENT DOCUMENTS

| EP | 2199755 A1 | 6/2010 |
| EP | 2453230 A1 | 5/2012 |

(Continued)

OTHER PUBLICATIONS

Wahab, Y. A. et al. in "Application of Transmission-Mode Ultrasonic Tomography to Identify Multiplase Flow Regime," Jun. 21-22, 2011, IEEE, International Conference on Electrical, Control and Computer Engineering, pp. 119-123.*

(Continued)

*Primary Examiner* — Michael Jung
(74) *Attorney, Agent, or Firm* — Bracewell LLP; Constance G. Rhebergen; Albert B. Kimball, Jr.

(57) ABSTRACT

Multiphase flow regimes in downhole or surface flow lines are made identifiable by forming images of the flow based on data obtained by flow regime metering of the flow. The flow regime metering data are gathered and processed in a format in which it can be subjected to face recognition processing of the type used for recognition of the faces of persons, and also to Bayesian classification techniques. Identification capabilities are particularly enhanced in flow regimes where gas bubbles or large amounts of free gas cause clutter and multiple reflections in the metering data.

16 Claims, 6 Drawing Sheets

Related U.S. Application Data

(60) Provisional application No. 61/973,367, filed on Apr. 1, 2014.

(51) Int. Cl.
    *G06T 11/00*    (2006.01)
    *G01P 5/00*     (2006.01)

(56) References Cited

U.S. PATENT DOCUMENTS

| | | | |
|---|---|---|---|
| 5,719,329 | A | 2/1998 | Jepson et al. |
| 5,845,743 | A | 12/1998 | Dechant |
| 5,929,342 | A | 7/1999 | Thompson |
| 6,354,146 | B1 | 3/2002 | Birchak et al. |
| 6,655,221 | B1 | 12/2003 | Aspelund et al. |
| 6,758,100 | B2 | 7/2004 | Huang |
| 8,360,635 | B2 | 1/2013 | Huang et al. |
| 9,612,145 | B2 * | 4/2017 | Hurmuzlu ............... G01F 1/74 |
| 2002/0011120 | A1 | 1/2002 | Huang |
| 2003/0051558 | A1 | 3/2003 | Melnikov et al. |
| 2006/0266127 | A1 | 11/2006 | Gysling et al. |
| 2008/0163700 | A1 | 7/2008 | Huang |
| 2009/0306911 | A1 | 12/2009 | Gysling |
| 2010/0299088 | A1 * | 11/2010 | Huang ............... G01F 1/667 702/48 |
| 2011/0112773 | A1 | 5/2011 | Atkinson |
| 2012/0055239 | A1 * | 3/2012 | Sinha ............... G01N 29/024 73/61.79 |
| 2012/0227473 | A1 * | 9/2012 | Sinha ............... G01F 1/66 73/61.75 |
| 2013/0086994 | A1 | 4/2013 | Noui-Mehidi |
| 2014/0008304 | A1 | 1/2014 | Jansen et al. |
| 2014/0331783 | A1 | 11/2014 | Xie |
| 2015/0233747 | A1 * | 8/2015 | Mitri ............... G01F 1/66 73/861.28 |
| 2015/0276445 | A1 | 10/2015 | Black |
| 2016/0076926 | A1 * | 3/2016 | McCann ............ G01N 33/2823 73/152.29 |

FOREIGN PATENT DOCUMENTS

| | | | |
|---|---|---|---|
| WO | 02/077635 | A2 | 10/2002 |
| WO | 2005/031279 | A1 | 4/2005 |
| WO | 2007/129897 | A1 | 11/2007 |
| WO | 2009/112834 | A1 | 9/2009 |
| WO | 2012/087120 | A1 | 6/2012 |
| WO | 2013/028870 | A1 | 2/2013 |
| WO | 2013084183 | A2 | 6/2013 |

OTHER PUBLICATIONS

Mohd H. F. Rahiman, Ruzairi A. Rahim, Herlina A. Rahim and Nor M. N. Ayob (2012). Design and Development of Ultrasonic Process Tomography, Ultrasonic Waves, Dr. Santos (Ed.), ISBN: 978-953-51-0201-4, InTech, pp. 211-226. Available from: http:www.intechopen.com/books/ultrasonic-waves/design-and-development-of-ultrasonic-process-tomography.*

Ayob et al. in, "Detection of Small Gas Bubble using Ultrasonic Transmission-mode Tomography System," (Oct. 3-5, 2010) IEEE Symposium on Industrial Electronics and Application (ISIEA 2010), Penang, Malaysia.*

"Handbook of Multiphase Metering", Norwegian Society for Oil and Gas Measurement/The Norwegian Society of Chartered Technical and Scientific Professionals, (2005).

Avinash C. Kak, Malcolm Slaney, "Principles of Computerized Tomographic Imaging," IEEE Press, New York, USA (1988), Chaper 3,pp. 49-112.

Bishop, "Pattern Recognition and Machine Learning", Springer, Berlin, Chapter 3.3 Bayesian Linear Regression p. 152-160 (2007).

Bishop, "Pattern Recognition and Machine Learning", Springer, Berlin, Chapter 4.5 Bayesian Logistic Regression p. 217-220 (2007).

Bishop, "Pattern Recognition and Machine Learning", Springer, Berlin, Chapter 8.1 Bayesian Networks p. 360-371 (2007).

Brennen, C.E., "Fundamentals of Multiphase Flows", Cambridge University Press, Chapter 7 Flow Patterns p. 163-195 (2005).

H. Murrell, "Computer-Aided Tomography," The Mathematical J. V6 (1996), pp. 60-65.

H.Luo, "A Training Based No-Reference Image Quality Assessment Algorithm," Int. Conf. on Image Proc., 5 (2004) pp. 2973-2976.

Hindi, "A Noise Tolerant Fine Tuning Algorithm for the Naïve Bayesian Learning Algorithm", J. of King Saud Univ.—Comp. and Inf. Sci. 26, (2014) pp. 237-246.

L. Sirovich and M. Kirby, "Low-dimensional procedure for the characterization of human faces," J. Opt. Soc. Am A, 4 (1987), pp. 519-524.

M.H.F.Rahiman et al. "Design and modeling of ultrasonic tomography for two-component high-acoustic impedance mixture," Sens. and Act. A: Phys., 147 (2008) pp. 409-414.

M.H.F.Rahiman et al. "The Front-End Hardware Design Issue in Ultrasonic Tomography," IEEE Sens. J., 10 (2010) pp. 1276-1281.

M.H.F.Rahiman et al. "Ultrasonic Process Tomographic Imaging Sensor: An Approach Utilising Transceivers Method," Proc. of the Int. Conf. on Comp uter and Comm. Eng. (2008).

M.H.F.Rahiman et al. "Ultrasonic Transmission-Mode Tomography Imaging for Liquid/Gas Two Phase Flow," IEEE Sens. J., 6 (2006) pp. 1706-1715.

M.Turk and A. Pentland, "Eigenfaces for Recognition" J. Cog. Neuroscience, 3(1) (1991), pp. 71-86.

M.Turk and A. Pentland, "Face Recognition Using Eigenfaces", Proc. IEEE Conf. on Comp. Vision and Patt. Recog., (1991) pp. 586-591.

N.M.N Ayob et al. "Ultrasound Processing Circuitry for Ultrasonic Tomography," Proc. of the Int. Conf. on Man-Machine Sys. (2009).

Press, Teukolsky, Vetterling, Filannery, "Numerical Recipes in C: The Art of Scientific Computing", Cambridge University Press, 2nd Edition Chapter 10, p. 394-455 (1992).

Von Kármán vortex shedding. Encyclopedia of Mathematics. URL: http://www.encyclopediaofmath.org/index.php?title=Von_K%C3%A1rm%C3%A1n_vortex_shedding&oldid=23554.

International Search Report and Written Opinion for related PCT application PCT/US/2015/021383 dated Jul. 22, 2015.

International Search Report and Written Opinion for related PCT application PCT/US2015/021375 dated Jul. 22, 2015.

International Search Report and Written Opinion for related PCT application PCT/US2015/021419 dated Jul. 22, 2015.

International Search Report and Written Opinion for related PCT application PCT/US2015/021437 dated Jul. 22, 2015.

International Search Report and Written Opinion for related PCT application PCT/US2015/021371 dated Dec. 14, 2015.

International Search Report and Written Opinion for related PCT application PCT/US2017/037266 dated Aug. 18, 2017.

* cited by examiner

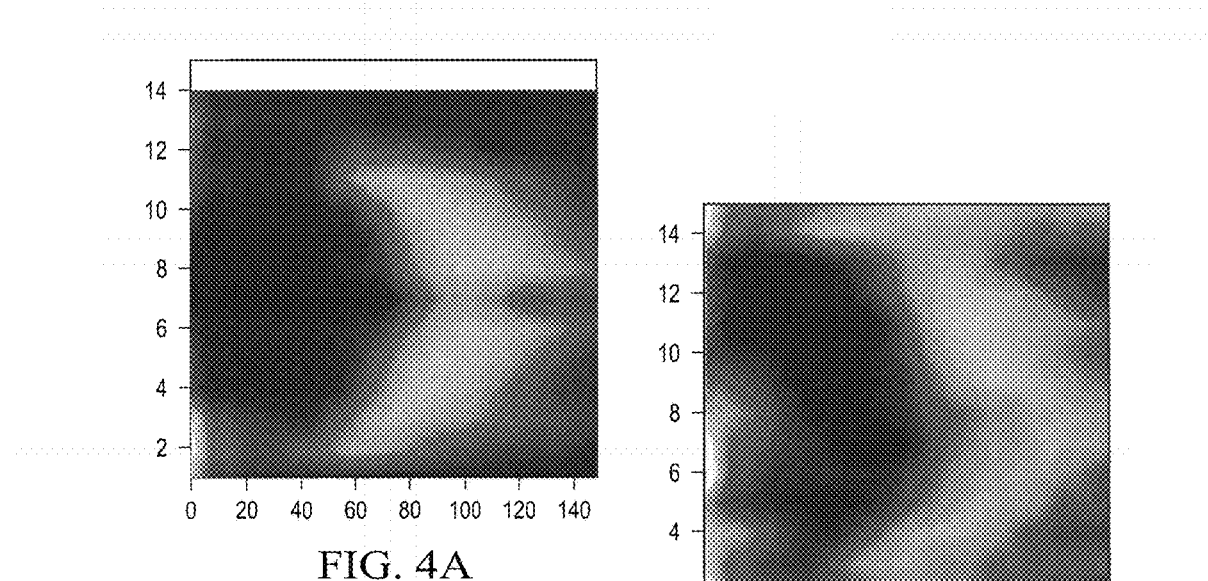
FIG. 4A
FIG. 4B
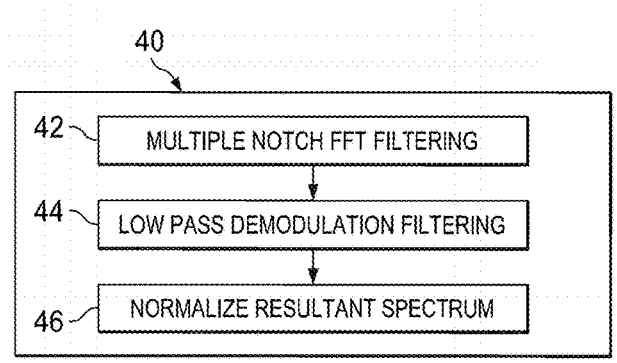
FIG. 5

FLOW REGIME IDENTIFICATION OF MULTIPHASE FLOWS BY FACE RECOGNITION BAYESIAN CLASSIFICATION

CROSS REFERENCE TO RELATED APPLICATIONS

This application claims priority from U.S. Provisional Application No. 61/973,367, filed Apr. 1, 2014, and its related, commonly owned U.S. patent application Ser. No. 14/595,689, filed Jan. 13, 2015, and now issued as U.S. Pat. No. 9,424,674. For purposes of United States patent practice, this application incorporates the contents of the Provisional Application by reference in entirety.

BACKGROUND OF THE INVENTION

1. Field of the Invention

The present invention relates to imaging of multiphase flow in conduits, and more particularly to flow regime identification by face recognition and Bayesian classification of multiphase flows of oil, water (brine) and gas in flow conduits.

2. Description of the Related Art

Fluid imaging of flow tends to focus in general on the imaging of two phases. The technique generally used for two phase flow reconstruction has been based upon what is known as the filtered back projection algorithm. This type of flow reconstruction is described for example by Kak, Avinash C., Slaney, Malcolm "*Principles of Computerized Fluid transit Imaging*," IEEE Press, New York, USA (1988), and Murrell, H. "Computer-Aided Tomography," *The Mathematical J.* V6 (1996), pp. 60-65.

However, because of the nature of the fluids present in production of oil and gas, it is necessary to form images of three phase flow in conduits involved in hydrocarbon production. Because of the different fluid properties of water (brine), oil and gas it is difficult to address all three sets of fluids simultaneously. In the case of oil-water or water-oil multiphase flows, the medium has been utilized. In the case of liquid-gas or gas-liquid flows (where the liquid is brine or oil or both) an attenuation approach has been utilized. As far as is known, neither method, however, has provided a wholly satisfactory identification or recognition of a three phase multiphase flow cross section.

One type of flow regime where identification is observed to be least accurate has been occurring when there are high levels of free gas within the conduit system. Such levels of free gas cause multiple reflections. Since tomography generally relies on transmission rather than more complex reflections, the presence of gas bubbles or large amounts of free gas can result in clutter and multiple reflections which impede flow regime identification based on tomographic reconstruction. Flow regime identification in conduit systems is also proving difficult where there were other challenging measurement conditions, such as wet gas or saturated bubbly flow.

SUMMARY OF THE INVENTION

Briefly, the present invention provides a new and improved apparatus for identification of flow regimes of multiphase flow in a conduit. The apparatus includes an array of a plurality of ultrasonic transceivers mounted about the periphery of the conduit transmitting and receiving energy for travel through the fluid in the conduit. The array of a plurality of ultrasonic transceivers mounted about the periphery of the conduit also receives energy after travel through the fluid in the conduit. The apparatus includes a data processing system forming indications of the flow regime of the multiphase flow in the conduit. A memory of the data processing system stores a database of flow regime data as a plurality of data matrixes representative of test flow conditions in the conduits for a plurality of test flow regimes in the conduit. The data processing system also includes a processor which forms measures of fluid transit data of the energy between individual ones of the transceivers and the remainder of the plurality of transceivers as a result of travel through the fluid in the conduit. The processor further organizes the measures of fluid transit data in an actual data matrix indicative of actual flow conditions in the conduit. The processor further forms a measure of correspondence between the data in the actual flow conditions in the actual data matrix and individual ones of the plurality of data matrixes representative of test flow conditions in the conduits for a plurality of test flow regimes. The processor identifies the flow regime of the actual flow conditions in the conduit based on the formed measures of correspondence. A display of the data processing system presents the identified flow regime of the actual flow conditions for evaluation and analysis.

The present invention also provides a new and improved data processing system for identification of flow regimes of multiphase fluid flow in a conduit, based on energy travel through the fluid in the conduit from a transmitting transceiver of an array of a plurality of transceivers about the periphery of the conduit to a plurality of receivers transceivers of the array. A memory of the data processing system stores a database of flow regime data as a plurality of data matrixes representative of test flow conditions in the conduits for a plurality of test flow regimes in the conduit. The data processing system also includes a processor which forms measures of fluid transit data of the energy between individual ones of the transceivers and the remainder of the plurality of transceivers as a result of travel through the fluid in the conduit. The processor further organizes the measures of fluid transit data in an actual data matrix indicative of actual flow conditions in the conduit. The processor further forms a measure of correspondence between the data in the actual flow conditions in the actual data matrix and individual ones of the plurality of data matrixes representative of test flow conditions in the conduits for a plurality of test flow regimes. The processor identifies the flow regime of the actual flow conditions in the conduit based on the formed measures of correspondence. A display of the data processing system presents the identified flow regime of the actual flow conditions for evaluation and analysis.

The present invention also provides a new and improved computer implemented method of forming flow regime images of three phase flow in a conduit based on energy travel through the fluid in a conduit from a transmitter of an array of a plurality of transceivers mounted about the periphery of the conduit to a plurality of receivers in the array of transceivers. A database of flow regime data is stored as a plurality of data matrixes representative of test flow conditions in the conduits for a plurality of test flow regimes in the conduit. Measures of fluid transit data of the energy between individual ones of the transceivers and the remainder of the plurality of transceivers as a result of travel through the fluid in the conduit are formed. The measures of fluid transit data are organized in an actual data matrix indicative of actual flow conditions in the conduit. A measure of correspondence between the data in the actual flow conditions in the actual data matrix and individual ones of the plurality of data matrixes representative of test flow conditions in the conduits for a plurality of test flow regimes is formed. The flow regime of the actual flow conditions in the conduit is identified based on the formed measures of correspondence, and the identified flow regime of the actual flow conditions is presented for evaluation and analysis.

The present invention also provides a new and improved data storage device having stored in a non-transitory computer readable medium computer operable instructions for causing a data processing system to form flow regime images of three phase flow in a conduit based on energy travel through the fluid in a conduit from a transmitter of an array of a plurality of transceivers mounted about the periphery of the conduit to a plurality of receivers in the array of transceivers. The instructions stored in the data storage device cause the data processing system to store a database of flow regime data as a plurality of data matrixes representative of test flow conditions in the conduits for a plurality of test flow regimes in the conduit. The instructions cause the data processing system to form measures of fluid transit data of the energy between individual ones of the transceivers and the remainder of the plurality of transceivers as a result of travel through the fluid in the conduit, and to organize the measures of fluid transit data in an actual data matrix indicative of actual flow conditions in the conduit. The instructions stored in the data storage device cause the data processing system to form a measure of correspondence between the data in the actual flow conditions in the actual data matrix and individual ones of the plurality of data matrixes representative of test flow conditions in the conduits for a plurality of test flow regimes. The instructions stored in the data storage device cause the data processing system to identify the flow regime of the actual flow conditions in the conduit based on the formed measures of correspondence, and present the identified flow regime of the actual flow conditions for evaluation and analysis.

BRIEF DESCRIPTION OF THE DRAWINGS

FIGS. 4A and 4B are example plots of flow faces for two types of multiphase flow regimes formed according to the present invention.

FIG. 5 is a functional block diagram of a set of steps performed according to the present invention in preprocessing of flow regime data for processing according to the processing of FIG. 8.

DETAILED DESCRIPTION OF THE PREFERRED EMBODIMENTS

Flow Regime Data Acquisition

According to the present invention, fluid transit data is acquired through ultrasonic measurements in the manner of the data acquisition for tomographic reconstruction according to Applicant's commonly owned, co-pending U.S. patent application Ser. No. 14/595,689. The present invention then organizes the acquired fluid transit data measurements for input into face recognition data processing. The present invention then utilizes machine learning and Bayesian classification techniques on such data. The present invention thus utilizes the entire set of the data, in contrast to tomographic reconstruction.

The richness of the data received in complex flow reflections in liquid gas has been found to hinder performance of tomographic reconstruction. With the present invention the complex flow data behaviors and patterns are of benefit to accurate flow regime identification.

Figure 1:
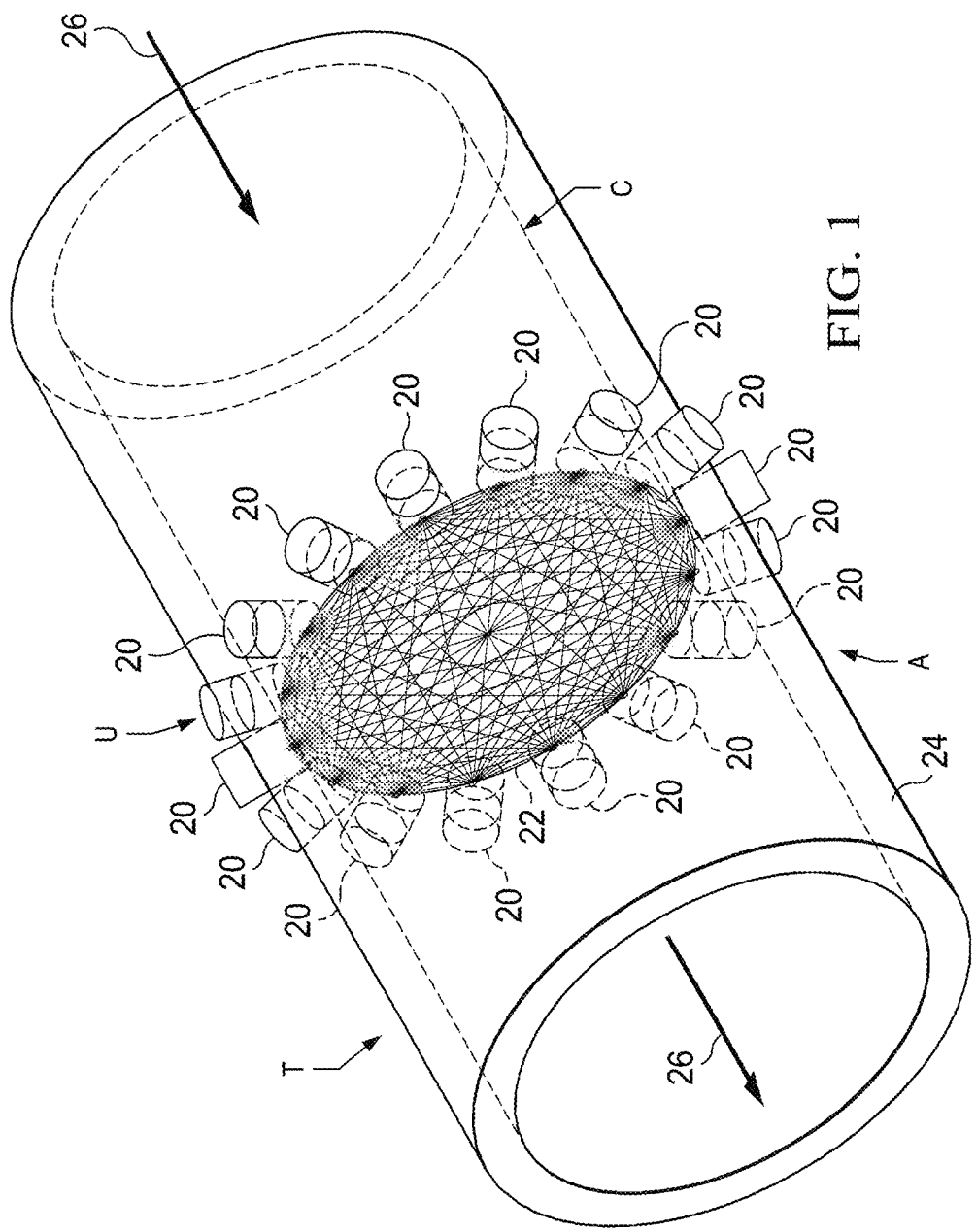
FIG. 1 is an isometric view, partially in schematic diagram form, of an ultrasonic imaging system mounted with a conduit according to the present invention.

Referring to FIG. 1, an ultrasonic flow regime measurement system T for data acquisition of an apparatus A according to the present invention for flow regime identification of three phase fluid flow in a conduit C is shown. The apparatus A also includes a data processing system D (FIG. 9) and methodology (FIGS. 5, 7, and 8) which provides flow regime identification of multiphase mixtures, as will be described below. In this preferred embodiment the three phases are oil, water (brine) and gas based on measurements from the flow regime system T.

The flow regime system T of the present invention takes the form of an array U of ultrasound transceivers 20 which transmit ultrasonic energy to travel through a flow conduit C, such as production tubing in a well bore or other pipe through which multiphase flow is or may be taking place. It should be understood that other conduits, either downhole or at the surface, through which three phase (water (or brine), oil and gas) fluid flow is to be measured may also be the subject of flow regime identification form acquired flow regime data according to the present invention. Consider the standard configuration for an ultrasonic flow regime measurement as shown in FIG. 2.

Figure 2:
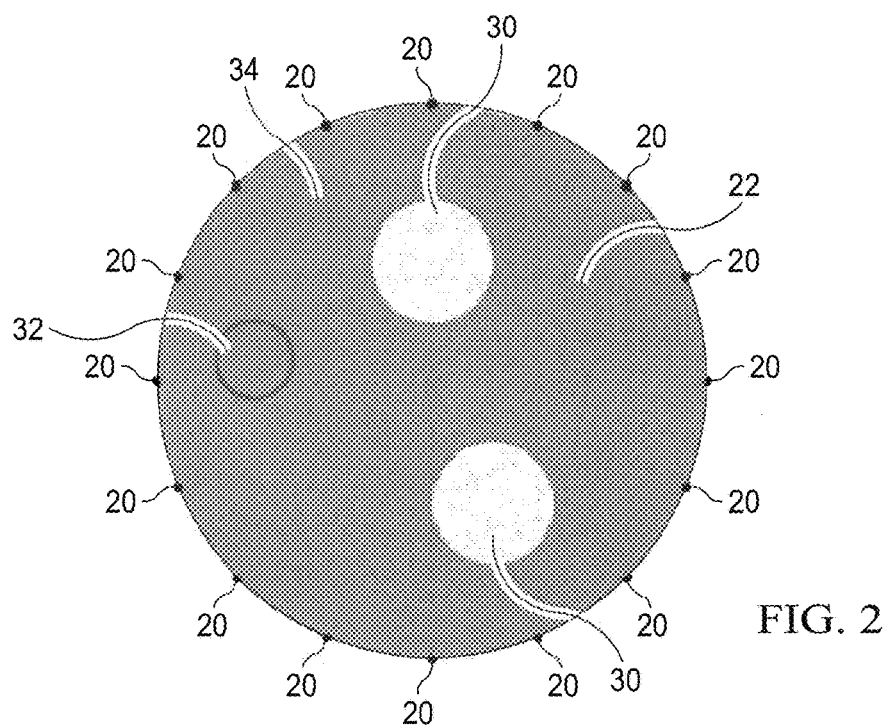
FIG. 2 is a vertical cross-section view of fluid flow through the ultrasonic imaging system of FIG. 1.

The measurement system T of FIG. 2 shows an array of N transducers situated in an evenly spaced circular array U around the outside of a pipe or production tubing 24 of the flow conduit C containing a multiphase flow pattern potentially consisting of a continuous oil phase 30, a gas phase 32 or a water phase 34. The precise configuration of the multiphase flow can vary to a different qualitative distribution which deviates from that shown in FIG. 1, but this is here for illustrative purposes. In the measurement each of the N sensors is pulsed in turn and the signals from the remaining (N−1) sensors are monitored for a time period starting with the initiation of the pulse up to sometime where all of the sound field has died down within the pipe. For a 3″ diameter pipe with transducers running at 330 kHz, this timescale is of the order of 200 μs.

The travel of energy through the fluids in the conduit C occurs over a network of transmission channels indicated schematically at 22. This generates a group of N(N−1) transmission paths 22 which can be visualized as similar to the arrangement of strings formed when playing the game of cat's cradle. Fluid properties can be measured along individual ones of the transmission channels 22 as represented as a line crossing from a transmitting transceiver 20 to a receiving transceiver 20. The transceivers 20 are mounted in conduit C such as the length of production tubing 24. The transceiver 20 is closely coupled acoustically to the multiphase flow indicated schematically by arrows 26 which is passing through the tubing 24.

Figure 3:
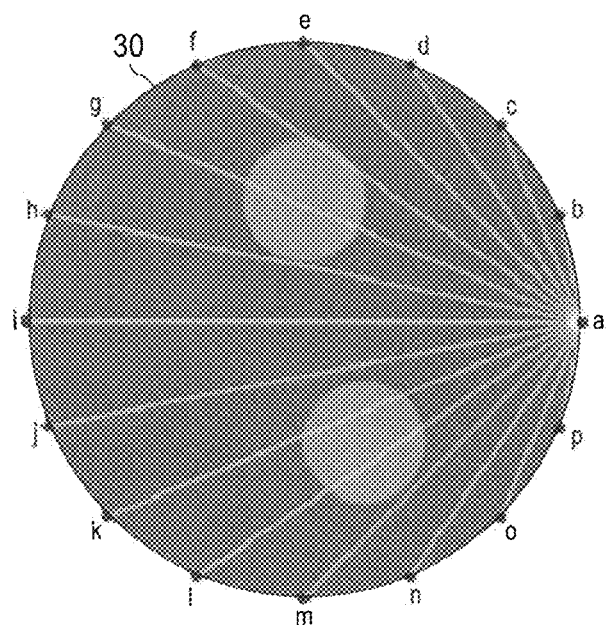
FIG. 3 is a schematic diagram of data acquisition sequencing in the ultrasonic imaging system of FIG. 1.

In general there are N transceivers 20. FIG. 3 shows sixteen as an example with each labeled by letters from 20a through 20p, respectively. In order to make a measurement, a single transducer such as indicated at sensor 20a in FIG. 2 is selected to be an example emitting source. The remaining sensors (20b through 20p, respectively) are chosen as receivers. In an example embodiment of the present invention, the transceivers 20 at each of locations 20a through 20p shown in FIG. 2 are 333 kHz ultrasound transducers manufactured by Pro-Wave in Taiwan. The pulse generates a burst of ultrasound energy which propagates out from transceiver 20a. For each receiving sensor 20b through 20p, the arrival time and attenuation can be measured as fluid transit data and transferred to a data processing system D (FIG. 9) for storage and subsequent processing, as will be described.

It is to be noted that a non-uniformity correction is required for attenuation measurement because the gain of each sensor a through p may be different. This non-uniformity correction can be calculated initially for the flow regime data acquisition system T before deployment within a known homogeneous fluid such as distilled water in a test conduit or container.

FIG. 2 shows the N−1 transmission paths generated from the transmitting device 20a. In bubbly or gaseous situations, multiple reflections or sound wave refraction can result in complex and multiple transmission paths from transmitter to receiver. In FIG. 2, if there are an even number N of transceivers, the angle increment α between adjacent paths (for example the angle i-a-h) is equal to α=π/N radians. Taking the line a-i as the 0 angle reference (irrespective of the angular orientation of the source), the ultrasound transit data in the form of travel time and attenuation measurements generate a set Γ of N−1 measurements with the following angles measured relative to the 0° angle which represents a central measurement which is diametrically straight across the pipe.

$$\Gamma = \left(\frac{N}{2} - n\right)\frac{\pi}{N} = \frac{\pi}{2} - \frac{n\pi}{N} = \frac{\pi}{2} - n\alpha \text{ where } 1 \leq n \leq N-1 \quad (1)$$

Equation (1) applies only for even values of N. It is straightforward to calculate odd values, but they are generally not considered in the measurement because they do not provide a straight across measurement with Γ=0.

For each of N transceivers (there are N−1 measurements of received transceiver voltage as a function of time which could, for example, be between 200 to 2000 or more measurements of voltage within a time window of 0-500 µs for a 3" pipe of flow conduit system. Time is measured relative to the initiation of the pulse on the transmitting transceiver, such as 20a. The transmitted pulse is typically a square voltage pulse of 10-100V with a duration of half the period of the excitation frequency of the transceivers—in the case of the 330 kHz devices used, the pulse duration is of the order of 1-2 µs).

A number of samples in each timed measurement are defined as S representing the number of samples per channel, which can range for example from about 200 to about 5,000. Taking measurements out over longer time scales such as these allows multiple passes of the ultrasound waves through the multiphase medium and can allow further differentiation. The acquisition of ultrasound flow transit data by the array U in the manner described above is indicated schematically at step 30 in a flow chart F (FIG. 8) illustrating the flow regime identification processing according to this present invention.

For a single measurement pulse, a matrix with dimensions of N−1×S is defined where each row of the matrix represents an individual value of F in descending order and each column of the matrix represents an individual time sampling point in one of each of the N−1 sampled channels. This matrix is defined as follows:

$M^{(m)}$ where $1 \leq m \leq N-1$

Each pulse to a different transceiver generates a new value of $M^{(m)}$. To combine the data together two options may be implemented according to the present invention:

Option (1): Concatenate or link together as a series $M^{(1)}$ to $M^{(N-1)}$ to form a N−1²×S sized matrix which is identified as M'.

Option (2): Perform an evaluation:

$$M'' = \frac{1}{N-1}\sum_{1}^{N-1} M^{(m)}$$

Regardless of whether Option (1) or Option (2) is used, the same argument applies. The benefit of using Option (1) is that no data is disregarded or thrown away, giving the chance of better classification down the line, but at the expense of requiring increased processing power because the matrices are larger. The benefit of using Option (2) is that smaller datasets are required with less computation and the averaging may smooth out some signal noise. However, some flow regime information is discarded by the averaging process.

According to the present invention, it has been found that a flow regime data obtained from ultrasound flow regime measurements with the array U organized into either of both of matrices M' and M" and processed according to the methodology described below are representative of what can be designated as "flow faces." Tests have obtained values for M" in a water-air flow loop and indicate an ability to visually differentiate between bubbly flow and continuous water flow when presented as such "flow faces". These are shown in FIGS. 4A and 4B. FIG. 4A represents an image of M" values formed according to the present invention for continuous water flow using an N=16 channel ultrasound array for measurements. FIG. 4B represents an image of M" values formed with the same ultrasound array for continuous sparse bubbly flow.

It is evident from FIGS. 4A and 4B that it is possible to differentiate by flow regime by visual inspection of such images. In FIG. 4A a clearly delineated crescent shape is observed which is indicative of the transmission through a homogeneous liquid medium with the same speed of sound. Stretching or compression of the crescent in the x-axis indicates an increase or a decrease of the speed of sound of the medium. Brightening or darkening of the intensity of the crescent would indicate a respective reduction or increase in the attenuation of the medium were the signal not normalized.

The presence of jitter or clutter in the medium as is evident in FIG. 4B is indicative of the presence of reflective components such as bubbles in the medium. In simplistic terms, looking for variation either locally or globally for x-axis stretching or deformation of the crescent, the presence of darkening or lightening of the signal, or for the presence of reflective clutter can be correlated with the presence of variations in speed of sound, attenuation or reflective sources.

Looking at different multiphase flow patterns as an example, the presence of bubbly gas flow would result in the presence of multiple reflection sources resulting in clutter on the signal as shown in FIG. 4B, and for example a multiphase liquid scenario such as oil and water would result in a stretching and contraction across the crescent shape without the addition of clutter.

With the present invention, the benefit of organizing the data in this manner is that the images can be directly input into approaches using image processing and recognition techniques of the type used to identify human faces, and Bayesian classification techniques to arrange the images into categories among which the probability of misclassification is statistically minimized. Once processed by the data processing system D (FIG. 9) in this manner, the flow regime in the pipe or conduit C is made identifiable as a result of its comparability to flow regimes of known characteristics which have been identified under test loop conditioning and shared as a flow regime data base.

Data Processing

Figure 8:
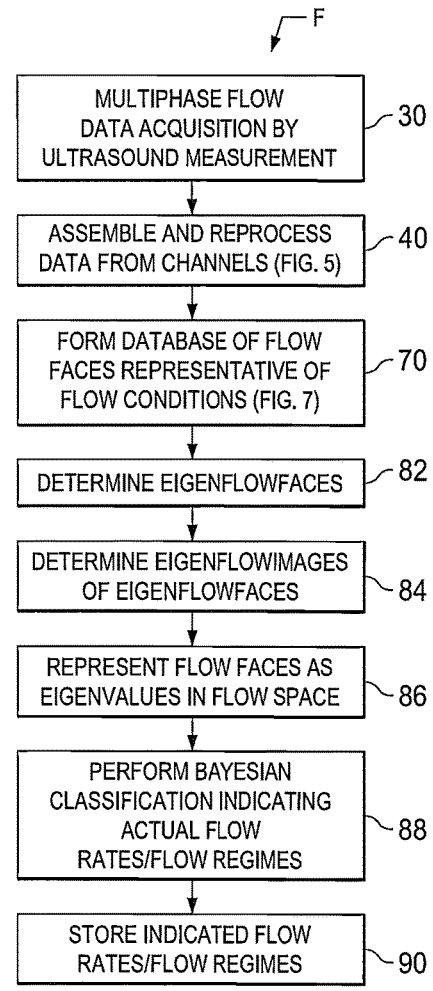
FIG. 8 is a functional block diagram of a set of steps performed in flow regime data acquisition for imaging of multiphase flow performed in accordance with the present invention.

A comprehensive methodology of flow regime identification according to the present invention utilizing ultrasound measurement data obtained from flow conduits by the measurement system T is illustrated schematically in in a flow chart F (FIG. 8).

The flow chart F illustrates the structure of the logic of the present invention as embodied in computer program software. Those skilled in the art will appreciate that the flow charts illustrate the structures of computer program code elements including logic circuits on an integrated circuit that function according to this invention. Manifestly, the invention is practiced in its essential embodiment by a machine component that renders the program code elements in a form that instructs a digital processing apparatus (that is, a computer) to perform a sequence of data transformation or processing steps corresponding to those shown.

Figure 6A:
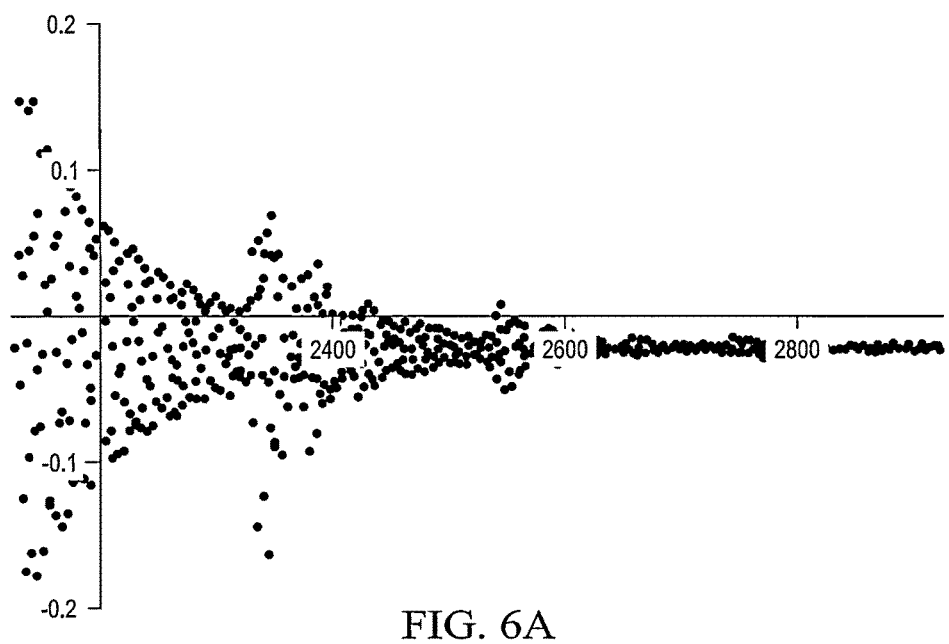
FIGS. 6A and 6B are example plots of flow regime data present during processing according to FIG. 5.
Figure 6B:
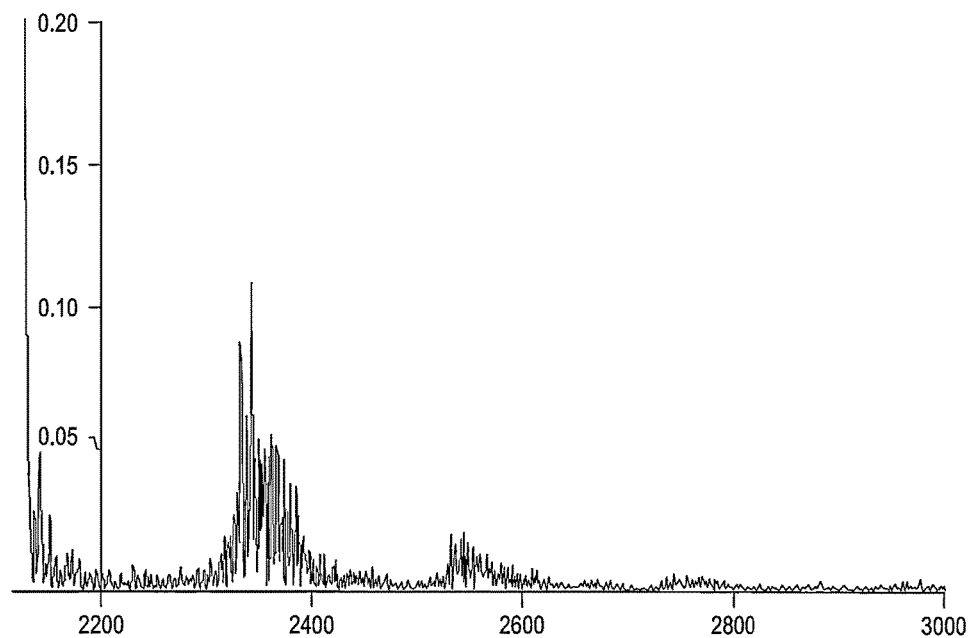

In order to get the fluid transit data (either in building a flow regime database or in unknown flow regime conditions) in an acceptable form for computerized processing in the data processing system D (FIG. 9), it is preferable to perform initial signal processing and normalization in a signal processing module 40 (FIG. 5). FIG. 6A shows example raw fluid transit data from a single channel measurement of the array U before processing, and FIG. 6B shows such data after processing in the signal processing module 40.

In the signal processing module 40, a series of steps are performed as indicated schematically in FIG. 5. The processing done in processing module 40 can be implemented, for example, in hardware using, for example, a FPGA (or field programmable gate array) circuit. As indicated at 42, multiple notch FFT filtering is performed on the channel fluid transit data to remove direct current or d.c. offset, low frequency decay and interference signals. As indicated at 44, a low pass demodulation filter is applied to the filtered data resulting from step 42 to provide an envelope response of the high frequency modulations, comparable to demodulation of an amplitude modulated or AM radio signal. As indicated at 46, the resulting spectrum from demodulation filtering in step 44 is normalized and the maximum or peak amplitude set equal to 1, with lesser amplitudes scaled proportionately as a fractional value of the peak amplitude.

Figure 7:
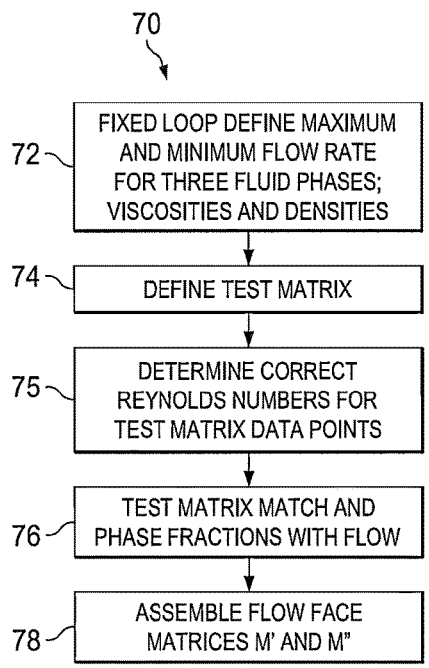
FIG. 7 is a functional block diagram of a set of steps performed according to the present invention in forming a database of flow faces representative of multiphase fluid flow regimes during the processing shown schematically in FIG. 8.

After processing in module 40, fluid transit data in matrix form has thus been prepared so that raw flow regime data is available as flow faces in the matrices M' or M" for further processing in the data processing D according to the present invention, as shown schematically in FIG. 7. During such processing, as will be set forth, the flow faces data in matrices M' or M" are subject to image identification processing. The flow face data is regarded as an image in the form of an image or picture quantity $\varphi^{(n)}$.

Accordingly, the flow regime data in each of the matrices M' or M" for each flow face or image is an ensemble of flow images $\{\varphi_n\}$, for n=1, 2, ..., M. An average or mean flow face image $\bar{\varphi}$ is represented as:

$$\bar{\varphi} = \langle \varphi \rangle = \frac{1}{M} \sum_{n=1}^{M} \varphi^{(n)}$$

Each flow image in the matrices also possesses what is termed a caricature $\phi^{(n)}$ representing the departure of that image from the mean which is defined as follows:

$$\phi^{(n)} = \varphi^{(n)} - \bar{\varphi}$$

Further details of the determination of image picture quantities, mean or average values and caricatures are set forth for example in Sirovich et al., "Low-dimensional procedure for the characterization of human faces", Journal of the Optical Society of America, Vol. 4, p. 519-524, March, 1987. The flow image data in this form can then be optimally processed by what are known as eigenflowfaces according to the present invention.

Forming Database of Flow Faces Representative of Flow Conditions

For flow regime identification by image recognition according to the present invention, construction of a flow regime ensemble or database of representative flow face is first formed as indicated at 70. With the present invention, characterization of the flow regime is based on data obtained in a flow loop rather than a well, since it is easier to establish different model flow regimes. The flow loop data should be generated and obtained keeping in mind that the model flow regimes should also be representative of flow regimes within a well. The well or field behavior can be mapped on to flow loop behavior by carefully considering the following physical properties or factors regarding the three fluid phases:

(a) Maximum and minimum flow rates of oil;
(b) Maximum and minimum flow rates of water or brine;
(c) Maximum and minimum flow rates of gas;
(d) Viscosity and density of oil;
(e) Viscosity and density of water or brine;
(f) Viscosity and density of gas; and
(g) Resultant mixture viscosities and densities making use of the appropriate mixture correlations.

FIG. 7 illustrates in a flow chart 70 a sequence of computer implemented instructions performed in the data processing system D to assemble the database of representative flow face examples which are used in connection with the flow regime identification according to FIG. 8. During step 72, quantities according to the physical properties of the fluid phases identified above are defined. From the properties, a range of Reynolds numbers are also determined during step 72 for the different flow configurations, noting the fractions of oil, water, and gas.

In step 74 a test matrix is defined where oil, water and gas flow are varied accordingly, and the Reynolds number of each is noted. During step 75, the physical properties for each set point in the test matrix, the relative mixtures of oil, water and gas flow are set in the flow loop, and the total flow scaled until the correct Reynolds number is attained.

Step 76 involves determining the test matrix for the flow loop and setting the various flows accordingly so the Reynolds number and phase fractions match the test matrix defined for the well. During step 78, a measure M' or M" for each of the test matrix points is formed, preferably taking care to move through the test matrix in different directions and possibly randomly to avoid systematic hysteresis effects. By completing step 78, an ensemble or database of M' or M" measurements which are representative of the multiphase flow conditions in a well are formed.

An average flow face $\bar{\varphi}$ is now determined in the manner described above, using the following relationship and taking M" as an example:

$$\langle M'' \rangle = \frac{1}{Q} \sum_{q=1}^{Q} M''^{(q)}$$

where there are a total of Q individual flow loop measurements and the index q represents the $q^{th}$ measurement for q=1 to Q.

Flow caricature matrices, C, (which are deviations from the average) are now determined using the following relation:

$$C^{(q)} = M''^{(q)} - \langle M'' \rangle$$

A dataset of flow caricatures is thus assembled and stored as a flow regime database and is available to determine eigenflowfaces during step 82 for the flow faces of the flow regimes.

Determination of Eigenflowfaces

Assuming M" is the matrix of data being processed, the dimensions of the flow caricature matrix $C^{(q)}$ are (N−1)×S. By taking each row and concatenating them or linking them together as a series, each $C^{(q)}$ can be considered to be a vector in (N−1)S dimensional space which with the present invention is termed flow space. According to the present invention, what are defined as eigenflowfaces are formed during step 82 of the flow face image data. Eigenflowfaces correspond to eigenvalues in matrix processing and represent the flow image data organized into the matrix form herein described. The eigenflowfaces are a series of orthogonal basis vectors in flow space which can be added up in a linear fashion to construct any flow face image.

The present invention thus provides for arranging the flow data in a similar manner to the inputs to known face recognition techniques. This may be done, for example by applying one of processing approaches described, for example, in L. Sirovich and M. Kirby, "*Low-dimensional procedure for the characterization of human faces,*" J. Opt. Soc. Am A, 4 (1987), pp. 519-524, previously mentioned; M. Turk and A. Pentland, "*Eigenfaces for Recognition*" J. Cog. Neuroscience, 3(1) (1991), pp. 71-86; or M. Turk and A. Pentland, "*Face Recognition Using Eigenfaces*", Proc. IEEE Conf. on Comp. Vision and Patt. Recog., (1991) pp. 586-591. It should be understood that other arranging of data processing techniques for image recognition may also be used.

The arranging of flow data during step 82 in the manner described generates a first eigenface vector so that the square of the Euclidean inner product between the eigenface vector and $C^{(q)}$ summed over all values of q and normalized by a 1/Q factor is reaching a maximum scalar value. The Journal of the Optical Society of Americas article by Sirovich previously mentioned, for example, provides a description of how this approach can be used to successively determine each of the eigenflowfaces (eigenfaces).

Determination of Eigenvalues

Once the eigenflowfaces are defined during step 82, each of the flowfaces is processed during step 84 to determine a set of eigenvalues that can be used to minimize the error between the approximation of the flow face and the flow face itself. The eigenvalues formed during step 84 are referred to according to the present invention as eigenflowimages. The eigenvalues are compressed versions in the form of a set of scalars representing characteristic values of the eigenflowfaces in the matrices.

The processing in step 84 uses a suitable minimization algorithm such as the one described in "*Numerical Recipes in C. The Art of Scientific Computing*", Cambridge University Press, $2^{nd}$ Edition (1992), W.H. Press, S. A. Teukolsky, W. T. Vetterling, B. P. Flannery. During such minimization, a matrix subtraction is performed between the approximation image and the real image to generate a difference matrix. Each element of the difference matrix is squared and all of the matrix elements are summed to provide a numerical value which increases as the two images get increasingly different. A score of 0 on this quantity would indicate identical images. An error quantity is defined as E.

During the minimization processing of step 84, processing begins for a first eigenflowface only, with the minimization processing described above performed, and searching for a minimum value of the error quantity E as the eigenvalue is varied. Next, a second eigenflowface is added and included to be cumulatively subjected to minimization, searching for a minimum value of error quantity E as the first two eigenvalues are varied in a 2 dimensional space. The minimization processing iteratively supplements through a number k of such processing steps for k eigenflowfaces, and a further eigenflowface added to those being subject to the minimization processing described above. During each step k for the k eigenflowfaces, searching is performed for the minimum value of error quantity E as the first k eigenvalues are varied in a k-dimensional space.

The required number of eigenflowfaces depends on the variability of the flow regimes that require investigation. Based on our initial analysis and studies, it is expected that a number k of about 10 steps should provide a reasonable approximation of the final flow face.

There is an important feature resulting from eigenvalues which offers possible advantages for telemetry. Using the eigenvalue approach of the present invention, and with the expected number k of about 10 minimization steps, it becomes possible to take a dataset of (N−1)S points, each with an 8 bit representation and condense it into 10 real numbers. In terms of data compression for a 16 channel system with 1000 samples per channel and 8 bit data point representation this equates to a memory space of 120,000 bits to represent the flow (about 117K).

With the eigenvalue methodology herein described, the status of the same multiphase flow can be represented in 320 bits using a single precision floating point representation (about 0.3 Kbits). This means the data is being compressed by a factor of 400 or so without losing significant information. Such data compression techniques independent of the Bayesian classification approach could be particularly advantageous for low bandwidth telemetry in open hole wells for the transmission of detailed information about flow status.

Representation in Flow Space

Based on the determination of the eigenflowfaces during step 84, which are specific to the scope of the test matrix defined in step 74, the present invention provides the ability to represent during step 86 multiphase flow data based on the eigenvalues alone in a k-dimensional flow space. The representations are provided by displays formed by the data processing system D.

Based on the results obtained in testing, such as those displayed in FIGS. 4A and 4B, it appears that flow measurement data cluster together according to the different type of flow regime being measured. Thus it is expected there are qualitatively different configurations of flow as the rates of each phase are varied. Treatises on multiphase flow indicate this to be the case. See, for example, C. E. Brennen, "*Fundamentals of Multiphase Flows*", Cambridge University Press, (2005). Because of the expected clustering this a Bayesian learning technique can now be applied during step 88 according to the present invention to help classify different flow regime scenarios.

Bayesian Classification of Flow Rates or Flow Regime

Bayesian classification processing is a known computer processing technique. Example descriptions of the Bayesian classification are described, for example, in "*A Noise Tolerant Fine Tuning Algorithm for the Naïve Bayesian Learning Algorithm*", J. of King Saud Univ. —Comp. and Inf. Sci. 26, (2014) pp. 237-246, K. El Hindi; and "Pattern Recognition and Machine Learning", Springer, Berlin, (2006), C. M. Bishop. According to the present invention, Bayesian classification is applied during step 88 to classify regimes based on certain flow phenomena. This is done in order that the flow regime images are more readily available and accessible for inspection and analysis. In accordance with the present invention, Bayesian classification of flow regime data is performed based on either flow rates of flow regimes. These two approaches appear to be suited for a multiphase metering system applied to well scenarios. It should be understood that Bayesian classification may also be performed based on other flow phenomena, as well.

As a function of oil, water and gas flows the multiphase flow regime is known to arrange itself into different flow patterns. This is described, for example, in the Brennen treatise, "Fundamentals of Multiphase Flows", previously mentioned. In a simple way, FIGS. 3A and 3B demonstrate qualitatively how the differences between liquid flow and bubbly flow are visibly apparent, and can be seen by eye.

In initially forming the flow regime database using test conditions in the flow loop as described above, a test matrix is configured during step 74 which generates a data set stored in the flow regime database. This stored flow regime database is then used in flow regime identification processing of data obtained in flow conduits of interest with unknown flow regimes. For each of the sets of data obtained the present invention allows the flow regime of the flow conduits to be individually investigated.

With the present invention, the test matrix of flow regime identification data stored in the flow regime database is representative of known flow regimes. These data are used as prior probabilities of known flow regimes which are used as prior probabilities and distributions of flow faces. The prior probabilities represent what is known as a class pattern for Bayesian classification. The prior probabilities are used in establishing expected groupings, in a process known as binning, of like ranges of flow regime types. Bayesian classification then is performed during step 88 on the flow regime data from unknown flow regimes obtained by the transducer array U.

As has been described above, the present invention provides an ability to represent flow data from an ultrasound array into a reduced dimensionality set of k parameters which can be used to identify the flow. Once the data can be plotted in such a way it is thus possible to perform Bayesian classification on the measurements.

Classification Against Flow Regime

With respect to the Bayesian classification approach, the data from each flow regime generates a sub-set of k-dimensional vectors in flow space. For each flow regime, each of these are binned together and Bayesian learning applied during step 88.

The Bayesian classification of step 88 produces output confidence levels based on measured data with respect to the probability that the flow is in a particular flow regime. Bayesian classification is thus used to provide a basis to analyze and determine during step 88 whether it is appropriate to use flow regime identification made during step 88 or whether other flow regime identification processing should be performed, such as reflection tomography of the type described in previously identified related co-pending application Ser. No. 14/595,689. Reflection tomography may be appropriate, for example, in connection with a wet gas flow regime.

Classification Against Flow Rate

The present invention also contemplates Bayesian classification against flow rate during step 88. In doing so, care is taken to scale the flow loop results with Reynolds numbers rather than absolute flow. This is done so that flow loop results map on to well flow situations.

Classification against flow rate is comparable to classification against flow regime. However, instead of binning with respect to flow regime, the binning is against increments of flow rate, either total or with respect to individual phases.

For example, specific flow values could in a total number of quantized steps equal to $J_{oil}$, $J_{water}$, $J_{gas}$ which would result in a total number R of bins:

$$R = J_{oil} J_{water} J_{gas}$$

Bayesian learning then takes place, and the output from the processing provides a confidence level or probability for each value of ($J_{oil}$, $J_{water}$, $J_{gas}$) which can be represented as a point in three dimensional space. The output of the Bayesian classification processing according to flow rate, can then be interpolated either linearly or bilinearly or through other methods between the quantized values to form a probability field in three dimensional space. The maximum value of probability provides an estimate for oil, water and gas flow. This processing also produces a flow measurement based on an array U of ultrasound transceivers as described above with regard to FIG. 1.

The flow regime identified during Bayesian classification processing step 88 as the actual flow regime is then stored during step 90 in memory of the data processing system D. The identified flow regime and data are also available for display and evaluation by engineers and analysts.

Data Processing System

Figure 9:
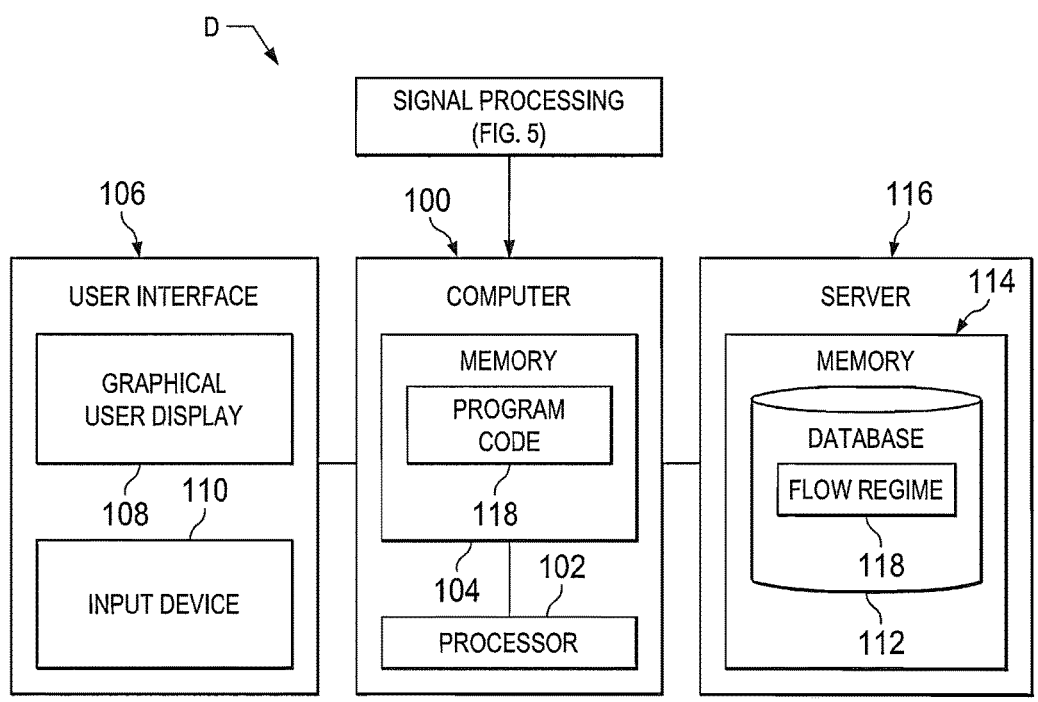
FIG. 9 is a schematic diagram of a data processing system for flow regime identification of multiphase flows by face recognition and Bayesian classification according to the present invention.

As illustrated in FIG. 9, the data processing system D according to the present invention includes a computer 100 having a processor 102 and memory 104 coupled to the processor 102 to store operating instructions, control information and database records therein. The computer 100 may, if desired, be a Linux cluster such as is available from HP Corporation or other source, a multicore processor with nodes such as those from IBM, Intel Corporation or Advanced Micro Devices (AMD), or a mainframe computer of any conventional type of suitable processing capacity such as those available from IBM, or other source.

It should be noted that other digital processors, may be used, such as personal computers in the form of a laptop computer, notebook computer or other suitable programmed or programmable digital data processing apparatus.

The computer 100 has a user interface 106 and an output display 108 for displaying output data or records according to the present invention to form flow regime images of multiphase flow in conduits based on flow regime data from the transducer arrays U or M. The output display 108 includes components such as a printer and an output display screen capable of providing printed output information or visible displays in the form of graphs, data sheets, graphical images, data plots and the like as output records or images.

The user interface 106 of computer 100 also includes a suitable user input device or input/output control unit 110 to provide a user access to control or access information and database records and operate the computer 100. The input/output control unit 110 also may receive data measurements of flow obtained during data acquisition in the manner described above. Data processing system D further includes a database 112 stored in memory, which may be internal memory 104, or an external, networked, or non-networked memory as indicated at 114 in an associated database server 116. As noted above, database 112 also contains the test flow regime database formed during the processing sequence 70 shown in FIG. 7.

The data processing system D includes program code 118 stored in non-transitory memory 104 of the computer 100. The program code 118, according to the present invention is in the form of computer operable instructions causing the data processor 102 to form flow regime images of multiphase flow in conduits, as has been set forth.

It should be noted that program code 118 may be in the form of microcode, programs, routines, or symbolic computer operable languages that provide a specific set of ordered operations that control the functioning of the data processing system D and direct its operation. The instructions of program code 118 may be stored in non-transitory form in memory 104 of the computer 100, or on computer diskette, magnetic tape, conventional hard disk drive, electronic read-only memory, optical storage device, or other appropriate data storage device having a non-transitory computer usable medium stored thereon. Program code 118 may also be contained on a data storage device such as server 114 as a non-transitory computer readable medium, as shown.

From the foregoing, it can be seen that multiphase flow measurements using ultrasound tomography can be accurate when there are high levels of free gas within the system which can cause multiple reflections. Since tomography generally relies on transmission rather than more complex reflections, the presence of gas bubbles or large amounts of free gas can result in clutter and multiple reflections which could confuse a straightforward tomographic reconstruction algorithm.

With the present invention, the same data obtained for a tomographic measurement is organized in such a way so that it can be input into face recognition algorithms which make use of machine learning, and Bayesian classification techniques. With the present invention all of the data within the measurement is used as opposed to only portions which are used for tomographic reconstruction. The richness of data received in complex flow reflections in liquid gas flows hinder the performance of regular tomographic reconstruction algorithms, but with the present invention this behavior is made to be of benefit.

The present invention provides augmented performances over known tomographic techniques. This is particularly the case in wet gas or bubbly flow regimes. The present invention may also be of benefit to existing systems by assisting in deciding the type of flow reconstruction processing to be used.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. An apparatus for identification of a flow regime of three phase flow of oil, water and gas in a conduit based on ultrasonic energy pulses received in a plurality of ultrasonic transceivers after travel through the three phase flow in the conduit, comprising:

the plurality of ultrasonic transceivers being mounted in an array about the periphery of the conduit;

the plurality of ultrasonic transceivers individually operable in turn to transmit as a transmitting transducer ultrasonic energy for travel through the fluid in the conduit;

the plurality of ultrasonic transceivers mounted in the array about the periphery of the conduit, when not operable to transmit, being operable to receive energy in the form of ultrasonic energy pulses after travel through the fluid in the conduit from the transmitting transducer; and a data processing system operable to identify the flow regime of the three phase flow of oil, water and gas in the conduit, comprising:

(1) a memory comprising a stored database of flow regime data of the three phase oil, water and gas flow as a plurality of data matrixes representative of known test flow regimes of oil, water and gas for a plurality of test flow regimes in the conduit;

(2) the memory further comprising stored program instructions to control operation of the data processing system to perform identification of the flow regime of three phase flow in the conduit;

(3) a signal processing module operable to perform initial signal processing and normalization of the received ultrasonic energy pulses;

(4) a processor operable under control of the stored program instructions to form measures of attenuation and travel times of the received ultrasonic energy pulses between individual ones of the transceivers and the remainder of the plurality of transceivers as a result of travel through the fluid in the conduit;

(5) the processor further being operable under control of the stored program instructions to organize the formed measures of attenuation and travel times of the received ultrasonic energy pulses in an actual data matrix indicative of actual flow regimes of oil, water and gas in the conduit;

(6) the processor further being operable under control of the stored program instructions to form measures of correspondence between the organized formed measures in the actual data matrix and individual ones of the plurality of data matrixes representative of known test flow regimes of oil, water and gas for the plurality of test flow regimes;

(7) the processor further being operable under control of the stored program instructions to identify the flow regime of the actual flow conditions of the three phase flow of oil, water and gas in the conduit based on the formed measures of correspondence; and (8) a display operable under control of the stored program instructions to present the identified flow regime of the actual flow conditions for evaluation and analysis.

2. The apparatus of claim 1, further including the data processing system comprising:

the memory further comprising a stored flow regime of the actual flow conditions identified by the processor.

3. The apparatus of claim 1, wherein the processor when operable under control of the stored program instructions to form measures of the correspondence between the organized formed measures in the actual data matrix and individual ones of the plurality of test conditions data matrixes is operable to perform Bayesian classification of the actual flow conditions data matrixes.

4. The apparatus of claim 3, wherein the Bayesian classification to form measures of the correspondence between the organized formed measures in the actual data matrix and individual ones of the plurality of test conditions data matrixes comprises Bayesian classification based on flow regimes.

5. The apparatus of claim 3, wherein the Bayesian classification to form measures of the correspondence between the organized formed measures in the actual data matrix and individual ones of the plurality of test conditions data matrixes comprises Bayesian classification based on flow rates.

6. The apparatus of claim 1, wherein the known flow regime data of the three phase oil, water and gas flow comprises:

flow rates of the three phases in the plurality of test flow regimes.

7. The apparatus of claim 1, wherein the known flow regime data of the three phase oil, water and gas flow comprises:

viscosity and density of the three phases in the plurality of test flow regimes.

8. The apparatus of claim 1, wherein the known flow regime data of the three phase oil, water and gas flow comprises:

mixture viscosities and densities of the three phases in the three phase oil, water and gas flow.

9. A data processing system for identification of flow regimes of multiphase fluid flow in a conduit, based on energy travel through the fluid in the conduit from a transmitting transceiver of an array transceivers about the periphery of the conduit to a plurality of receiving transceivers of the array of transceivers in the array, the data processing system comprising:

(a) a memory comprising a stored database of flow regime data of three phase oil, water and gas flow as a plurality of data matrixes representative of known test flow regimes of oil, water and gas for a plurality of test flow regimes in the conduit;

(b) the memory further comprising stored program instructions to control operation of the data processing system to perform identification of the flow regime of three phase flow in the conduit;

(c) a signal processing module operable to perform initial signal processing and normalization of the received ultrasonic energy pulses through the fluid in the conduit;

(d) a processor operable under control of the stored program instructions to form measures of attenuation and travel times of the received ultrasonic energy pulses between individual ones of the transceivers and the remainder of the plurality of transceivers as a result of travel through the fluid in the conduit;

(e) the processor further operable under control of the stored program instructions to organize the formed measures of attenuation and travel times of the received ultrasonic energy pulses in an actual data matrix indicative of actual flow regimes of oil, water and gas in the conduit;

(f) the processor further operable under control of the stored program instructions to form measures of correspondence between the organized formed measures in the actual data matrix and individual ones of the plurality of data matrixes representative of known test flow regimes of oil, water and gas in the conduits for the plurality of test flow regimes;

(g) the processor further operable under control of the stored program instructions to identify the flow regime of the actual flow conditions of the three phase flow of oil, water and gas in the conduit based on the formed measures of correspondence; and (h) a display operable under control of the stored program instructions to present the identified flow regime of the actual flow conditions for evaluation and analysis.

10. The data processing system of claim 9, further including:

the memory further comprising a stored flow regime of the actual flow conditions identified by the processor.

11. The data processing system of claim 9, wherein the processor is operable to perform Bayesian classification of the actual flow conditions data matrixes in forming measures of the correspondence of the actual flow condition data to the plurality of test conditions data matrixes.

12. The data processing system of claim 11, wherein the Bayesian classification to form measures of the correspondence of the actual flow condition data to the plurality of test conditions data matrixes is based on flow regimes.

13. The data processing system of claim 11, wherein the Bayesian classification to form measures of the correspondence of the actual flow condition data to the plurality of test conditions data matrixes is based on flow rates.

14. The data processing system of claim 9, wherein the known flow regime data of the three phase oil, water and gas flow comprises:
   flow rates of the three phases in the plurality of test flow regimes.

15. The data processing system of claim 9, wherein the known flow regime data of the three phase oil, water and gas flow comprises:
   viscosity and density of the three phases in the plurality of test flow regimes.

16. The data processing system of claim 9, wherein the known flow regime data of the three phase oil, water and gas flow comprises:
   mixture viscosities and densities of the three phases in the three phase oil, water and gas flow.

\* \* \* \* \*